Jan. 12, 1926.

E. D. MISNER 1,569,663

SHOCK ABSORBER

Filed Oct. 15, 1923

Inventor
Edgar D. Misner

By Whittemore Hulbert Whittemore Belknap
Attorneys

Patented Jan. 12, 1926.

1,569,663

UNITED STATES PATENT OFFICE.

EDGAR D. MISNER, OF DETROIT, MICHIGAN.

SHOCK ABSORBER.

Application filed October 15, 1923. Serial No. 668,726.

*To all whom it may concern:*

Be it known that I, EDGAR D. MISNER, a citizen of the United States of America, residing at Detroit, in the county of Wayne and State of Michigan, have invented certain new and useful Improvements in Shock Absorbers, of which the following is a specification, reference being had therein to the accompanying drawings.

The invention relates to shock absorbers and is particularly applicable to motor vehicles. One of the objects of the invention is the provision of a shock absorber which is simple in construction and can be readily manufactured at a low cost as well as easily assembled. Another object is the provision of a shock absorber in which the frame forms a housing for the spring as well as a friction bearing surface for the strap connected to the spring and to an axle of the motor vehicle. A further object is the provision of a shock absorber in which the frame also carries a bumper for limiting the movement of the axle toward the frame of the motor vehicle.

With these as well as other objects in view, the invention resides in the novel features of construction and combinations and arrangements of parts as more fully hereinafter set forth.

Figure 1:
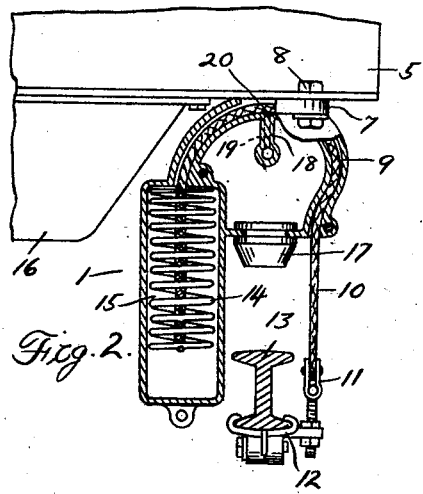
Figure 1 is an end view of a shock absorber embodying my invention.
Figure 2:
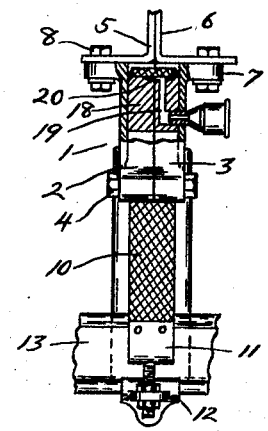
Figure 2 is a sectional elevation thereof.

1 is the frame of the shock absorber comprising the pair of complementary sections 2 and 3 secured to each other by the bolts 4. This frame is secured to the underside of the frame of the motor vehicle and in the present instance is designed to be secured to the underside of the frame of a make of motor vehicle having the channel side sills 5 and the V-shaped cross bar 6 of angle section secured to the webs of the side sills. The shock absorber frames have the lateral lugs 7 through which the bolts 8 extend for securing the shock absorber frame to the motor vehicle frame.

Each of the sections 2 and 3 is provided with the internal channel 9 which is adapted to register with the internal channel upon the other section to form a main channel slidably engaged in by the strap or web 10. This main channel is approximately semicircular and is so shaped that the strap or web normally engages its inner wall except at the lower front portion where the strap or web normally engages the outer wall. One end of the strap or web 10 is secured by means of the clip 11 and the clamp 12 to the lower flanges of the front axle 13, while the opposite end is secured to the outer end of the coil spring 14, which latter is housed within the frame 1. As shown, the complementary sections 2 and 3 of this frame have elongated recesses 15 which are adapted to register with each other and communicate with the internal channels 9. These recesses, when together, form a cylindrical space for receiving the coil spring. By reason of the fact that in the above-mention type of motor vehicle, the dust pan 16 provides but very little clearance for the shock absorber, the frame housing for the spring extends substantialy vertically and beside the front axle.

For the purpose of limiting the relative movement of the axle and motor vehicle frame toward each other, I have provided the bumper 17 formed of suitable yieldable material such as rubber. This bumper is secured upon the frame 1, and as shown is embraced by the complementary sections 2 and 3 of the frame and so positioned that it is adapted to engage the upper face of the axle.

For the purpose of lubricating the major portion of the friction bearing surface upon the shock absorber frame for the strap or web, I have formed the complementary sections 2 and 3 with the cross web 18, the cross web of one of the sections having the lubricant passage 19 opening into the groove 20 in the lower wall of the internal channel 9 of each section, the arrangement being such that as the strap or web 10 slides within the channels 9, it comes into contact with lubricant and thereby distributes the same over the major portion of the friction bearing surface.

To provide a simple and inexpensive means for securing the strap or web to the spring which permits of easy assembly of the two, I provide the like clip members 21 secured by suitable means to the strap or web and each provided with a hooked or bent end 22. A member is secured to each of the opposite sides of the strap or web and as a consequence, the hooked or bent ends extend in opposite directions. These ends terminate a sufficient distance from the end of the strap or web to permit of inserting or removing the transverse or diametrically extending end portion 23 of the coil spring 14. To assemble the parts, the strap or web is turned at an angle to the transverse or diametrically extending end portion of the spring and moved toward the same and then turned to bring the parts into engagement. After they are engaged and the shock absorber assembled upon the motor vehicle, the strap or web will always be under tension, and furthermore will have no tendency to rotate relative to the spring so that the parts will remain in engagement.

Figure 4:
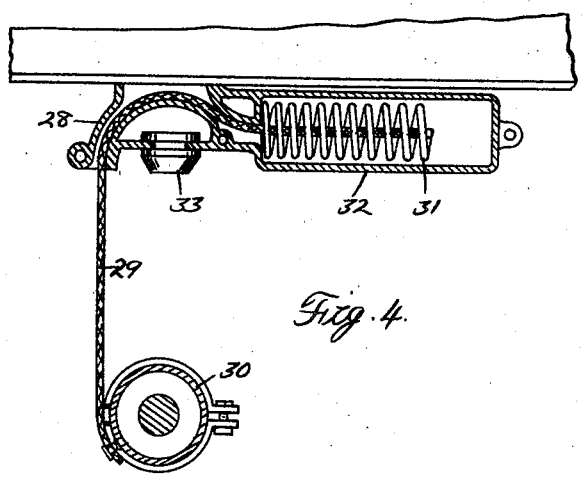
Figure 4 is a section thereof.
Figure 3:
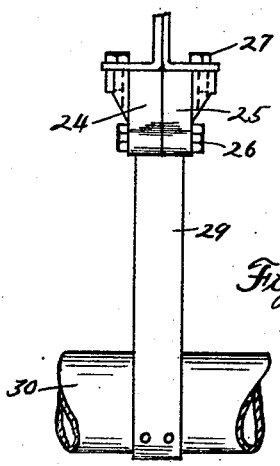
Figure 3 is an end view of a modified construction of my shock absorber.
Figures 5, 6:
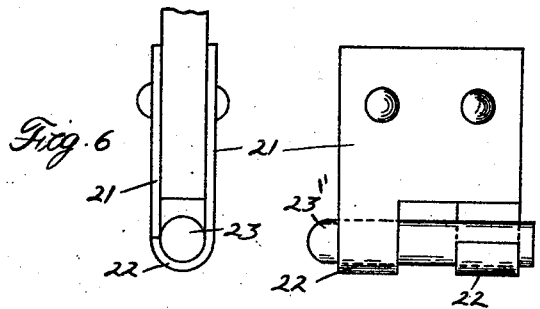
Figures 5 and 6 are respectively side and edge views of the clip for securing the strap to the spring.

In the modified construction shown in Figures 3 and 4 the shock absorber is adapted to be connected to the rear axle of the motor vehicle instead of to the front axle. The frame of this shock absorber comprises the complementary sections 24 and 25 which are secured to each other by the bolts 26 and are adapted to be secured to the under side of the motor vehicle frame by the bolts 27. Each of the complementary sections has the internal substantially semi-circular channel 28 adapted to register with the channel of the other section and together forming a main channel slidably engageable in by the strap or web 29, one end of which is secured to the rear axle housing 30 and the other end of which is secured to the outer end of the coil spring 31. This coil spring is housed between the horizontally extending portions 32 of the shock absorber frame which are provided with elongated recesses for receiving the coil spring. The channels 28 of the shock absorber frame are so formed that the major portion of the friction bearing surface is formed upon the lower wall and a minor portion is formed upon the upper wall adjacent to the spring housing. The complementary sections 24 and 25 are also formed to embrace and hold the yieldable bumper 33 which is positioned so that it is engageable with the upper side of the axle housing 30.

From the above description, it will be readily seen that I have provided a simple construction of shock absorber which is very compact. Also, this shock absorber being made of complementary sections may be die cast, thereby decreasing the cost of manufacture and at the same time permitting of greater ease in assembling. Furthermore, the shock absorber carries a bumper for yieldably limiting the movement of the axle toward the frame of the motor vehicle.

What I claim as my invention is:

1. In a shock absorber, the combination with a frame comprising a plurality of complementary sections having internal channels registering with each other, of a strap slidably engaging in said channels, and a spring for placing said strap under tension.

2. In a shock absorber, the combination with a frame having a pair of sections provided with internal channels registering with each other, of a strap slidably engaging in said channels and substantially housed by said sections, and a spring upon said frame for placing said strap under tension.

3. In a shock absorber, the combination with a frame having a pair of complementary sections provided with internal channels registering with each other, of a strap slidably engaging in said channels, a spring for placing said strap under tension, and a housing upon said frame for said spring.

4. In a shock absorber, the combination with a frame comprising a pair of sections having internal channels registering with each other and also elongated recesses registering with each other and opening into said channels, of means for securing said sections to each other, a strap slidably engaging in said channels, and a spring located within said recesses and connected to said strap.

5. In a shock absorber, the combination with a frame having an approximately semi-circular internal channel, of a strap slidably engaging in said channel, a spring upon said frame for placing said strap under tension, and a lubricant passageway leading to said channel through its inner wall for distribution to said strap.

6. In a shock absorber, the combination with a frame having an internal channel, of a strap slidably engaging in said channel, a spring for placing said strap under tension, and a bumper carried upon said frame.

7. In a shock absorber, the combination with a frame having a pair of complementary sections provided with internal channels registering with each other, of a strap slidably engaging in said channels, a spring for placing said strap under tension, and a bumper, said pair of sections cooperating to house said spring and hold said bumper in place.

8. In a shock absorber for a motor vehicle, the combination with a frame adapted to be secured to the under-side of the motor vehicle frame, and comprising a pair of sections provided with internal channels registering with each other, of a strap slidably engaging in said channels and having one end connected to an axle of a motor vehicle, a spring housed within said shock absorber frame and connected to the other end of said strap, and a bumper embraced by the sections of said shock absorber frame and adapted for engagement by the motor vehicle axle.

9. In a shock absorber, the combination with a frame, of a strap slidably engaging said frame, a spring upon said frame having a diametrically extending end portion, and a clip for securing said strap to said spring comprising like members on opposite sides of said strap and provided with oppositely extending bent ends terminating a sufficient distance from said strap to permit inserting or withdrawing said spring end portion.

10. In a shock absorber, the combination with a frame comprising a pair of sections each having corresponding internal channels registering with each other when the sections are clamped together, of means for clamping said sections together, a strap slidably engaging in said channels, and means for placing said strap under tension.

In testimony whereof I affix my signature.

EDGAR D. MISNER.